United States Patent
Germain

(10) Patent No.: US 8,339,464 B2
(45) Date of Patent: Dec. 25, 2012

(54) UNIVERSAL TEST SYSTEM FOR CONTROLLING A PLURALITY OF PARAMETERS CONCERNING THE OPERATION OF A DEVICE FOR PRESENTING OPTOELECTRONIC INFORMATION OF VARIOUS TYPES

(75) Inventor: Aurélie Germain, Plaisance du Touch (FR)

(73) Assignee: EADS Test and Services, Elancourt (FR)

( * ) Notice: Subject to any disclaimer, the term of this patent is extended or adjusted under 35 U.S.C. 154(b) by 321 days.

(21) Appl. No.: 12/532,580

(22) PCT Filed: Mar. 21, 2008

(86) PCT No.: PCT/FR2008/000385
§ 371 (c)(1),
(2), (4) Date: Mar. 25, 2010

(87) PCT Pub. No.: WO2008/135664
PCT Pub. Date: Nov. 13, 2008

(65) Prior Publication Data
US 2010/0214418 A1   Aug. 26, 2010

(30) Foreign Application Priority Data

Mar. 22, 2007   (FR) .................................... 07 02084

(51) Int. Cl.
*H04N 17/00* (2006.01)
*H04N 17/02* (2006.01)
(52) U.S. Cl. .................... 348/189; 348/180; 348/184
(58) Field of Classification Search .................. 348/180, 348/184, 189
See application file for complete search history.

(56) References Cited

U.S. PATENT DOCUMENTS

| | | | | |
|---|---|---|---|---|
| 5,675,380 A | * | 10/1997 | Florent et al. | 348/251 |
| 5,699,440 A | * | 12/1997 | Carmeli | 382/100 |
| 5,918,192 A | * | 6/1999 | Tomaszewski | 702/85 |
| 5,969,756 A | * | 10/1999 | Buckley et al. | 348/190 |
| 5,999,213 A | * | 12/1999 | Tsushima et al. | 348/180 |
| 6,016,161 A | * | 1/2000 | Robinson | 348/187 |
| 6,483,555 B1 | * | 11/2002 | Thielemans et al. | 348/745 |
| 6,558,006 B2 | * | 5/2003 | Ioka | 353/94 |
| 6,618,076 B1 | * | 9/2003 | Sukthankar et al. | 348/180 |
| 6,717,625 B1 | * | 4/2004 | Thielemans | 348/745 |
| 6,798,444 B2 | * | 9/2004 | Adan | 348/189 |
| 7,023,472 B1 | * | 4/2006 | Kang et al. | 348/187 |
| 7,102,648 B1 | * | 9/2006 | Holub | 345/589 |
| 7,110,022 B2 | * | 9/2006 | Aoyama | 348/187 |
| 7,215,362 B2 | * | 5/2007 | Klose | 348/189 |
| 7,227,592 B2 | * | 6/2007 | Waters et al. | 348/745 |
| 7,479,982 B2 | * | 1/2009 | Otani et al. | 348/188 |
| 7,489,335 B2 | * | 2/2009 | Kochi et al. | 348/180 |
| 7,536,094 B2 | * | 5/2009 | Ichimiya | 396/89 |
| 7,542,055 B2 | * | 6/2009 | Matsuda et al. | 345/690 |
| 7,639,277 B2 | * | 12/2009 | Shibuya et al. | 348/190 |
| 7,671,891 B2 | * | 3/2010 | Fitzgibbon et al. | 348/188 |

(Continued)

*Primary Examiner* — Brian Yenke
(74) *Attorney, Agent, or Firm* — Browdy and Neimark, PLLC

(57) ABSTRACT

According to the invention, the test system uses a digital photography device (4) that can be remotely controlled from a computer system including a processor (20) coupled to a man/machine interface (21) and to the presentation device to be tested by a remote transmission means. A means is further provided for centering the photographic apparatus (4) opposite the presentation device (5) to be tested. The processor (20) is programmed so as to carry out a self-positioning phase of the photographic apparatus, an automatic focalization phase of the lens, and a test phase of the information presentation device.

5 Claims, 1 Drawing Sheet

U.S. PATENT DOCUMENTS

| | | | |
|---|---|---|---|
| 7,710,433 B2* | 5/2010 | Holub | 345/589 |
| 7,876,384 B2* | 1/2011 | McDowall et al. | 348/745 |
| RE42,089 E* | 2/2011 | Holmes | 348/179 |
| 7,889,235 B2* | 2/2011 | Urisu | 348/191 |
| 7,995,098 B2* | 8/2011 | Pedeville et al. | 348/190 |
| 2002/0018139 A1* | 2/2002 | Yamagata | 348/333.09 |
| 2003/0193564 A1* | 10/2003 | Jenkins | 348/182 |
| 2004/0066454 A1* | 4/2004 | Otani et al. | 348/188 |
| 2004/0085477 A1* | 5/2004 | Majumder et al. | 348/383 |
| 2004/0189805 A1* | 9/2004 | Seitz | 348/188 |
| 2004/0227708 A1* | 11/2004 | Huelson et al. | 345/77 |
| 2005/0021258 A1* | 1/2005 | Fasciano | 702/67 |
| 2005/0073530 A1* | 4/2005 | Kapur et al. | 345/594 |
| 2005/0083402 A1* | 4/2005 | Klose | 348/52 |
| 2005/0261849 A1* | 11/2005 | Kochi et al. | 702/85 |
| 2006/0230312 A1* | 10/2006 | Nichols et al. | 714/25 |
| 2007/0058044 A1* | 3/2007 | Pedeville et al. | 348/189 |
| 2007/0115361 A1* | 5/2007 | Bolas et al. | 348/189 |
| 2009/0213224 A1* | 8/2009 | Zandifar et al. | 348/187 |
| 2009/0273681 A1* | 11/2009 | Border et al. | 348/189 |

* cited by examiner

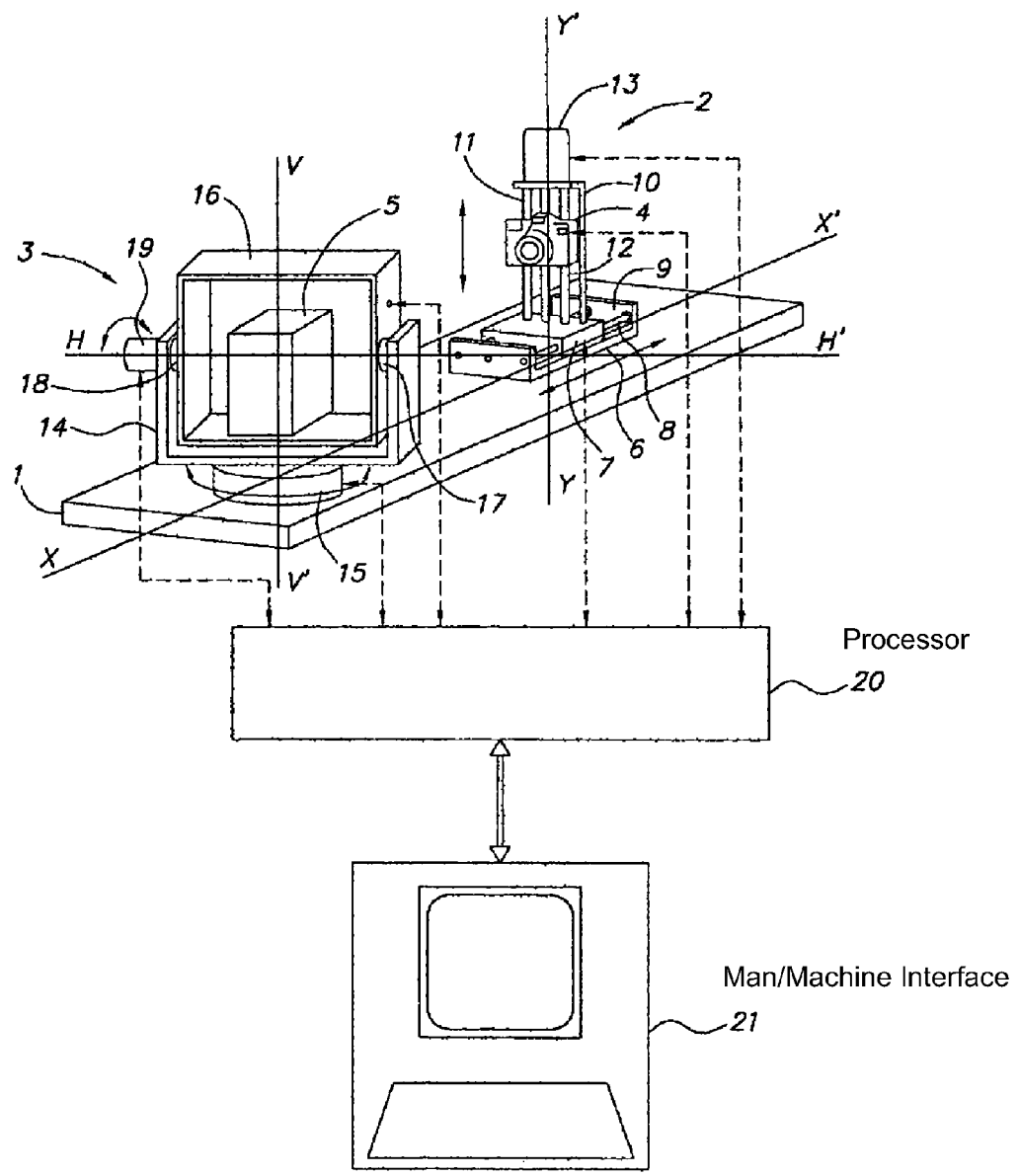

US 8,339,464 B2

UNIVERSAL TEST SYSTEM FOR CONTROLLING A PLURALITY OF PARAMETERS CONCERNING THE OPERATION OF A DEVICE FOR PRESENTING OPTOELECTRONIC INFORMATION OF VARIOUS TYPES

BACKGROUND OF THE INVENTION

1. Field of the Invention

The invention relates to a universal test system capable of controlling a plurality of parameters relating to the operation of display devices for presenting optoelectronic information of various types. It applies both to screen displays, for example with a cathode tube (CRT), with liquid crystals (LCD), or even with a plasma and to devices in which the image is projected to infinity such as for example Head Up Displays (HUD), display systems by projection on the windscreen or even Helmet Mounted Displays (HMD).

More particularly, the object of the invention is to allow a characterization of these information presentation devices, by means of a single sensor easy to use and allowing the whole of the measurements and tests required for this characterization to be carried out in an automatic mode, i.e. notably but in a non-limiting way:

- colorimetric tests (both in one point and in the whole field of the display),
- color uniformity test (histogram of colors . . . )
- luminance measurements, which may also be carried out in the whole field of the display, uniformity tests may further be conducted in all the points of the field,
- detection of faulty pixels (one or more pixels, clusters . . . ),
- geometrical measurements (trace width, parallax, distortion . . . ),
- detection of overlay of elementary patterns in an image . . .

2. Description of the Prior Art

It is known that in the present state of the art, specific testing means are associated with each type of equipment being used for presenting information, which is particularly "expensive" if equipment has to be acquired involving display or viewing devices of different types.

Moreover, this extra equipment generates additional costs notably for the maintenance of the test means and management of obsolescence. Further, these test means frequently involve several sensors each assigned to a type of measurement carried out.

Thus, for a measurement of luminance, the sensor used will be a luminance meter; a colorimetric measurement will involve a colorimeter; for accurate measurements, a small field high resolution sensor will be used; for standard geometrical measurements, the sensor used will be a large field medium resolution sensor; certain measurements such as those relating to the detection of faulty pixels or to the analysis of elementary patterns, are usually conducted in a manual mode.

These drawbacks are again found in the inspection device descried in patent U.S. Pat. No. 6,064,462 which exploits the correlation between Newton rings formed at the surface of a liquid crystal display panel and the space between the two glass plates containing the liquid crystal, in order to check the uniformity of said space: this principle cannot be contemplated in a viewing device which does not use a liquid crystal display.

Also, Japanese patent JP 31 603 10 uses an assembly applying several photographic devices intended to take photographs of a test pattern shown on the cathode screen of an information presentation device. This assembly is specifically designed for a particular type of cathode screen and is not suitable for other display types such as head up displays or helmet mounted displays, for example.

Document WO 02/39 753 as for it, describes a device for testing liquid crystal display devices which uses light source means illuminating the display laterally as well as a photographic apparatus intended to receive, via a polarizer and a filter, a fraction of the light reflected by the display. A processor analyzes the image received by the photographic apparatus in order to check a certain number of criteria. This device is therefore specifically used for liquid crystal displays and is not suitable for the other types of displays.

OBJECT OF THE INVENTION

More particularly the object of the invention is therefore to suppress these drawbacks by using a single sensor with which the whole of the measurements and usual tests may be carried out automatically or semi-automatically on most display devices or displays existing on the market, so as to:

- homogenize the test means used in companies using different types of display or viewing means,
- uniformize the test procedures and the obtained results (because a single sensor is used),
- reduce the investment costs and maintenance costs by using means for a single acquisition,
- reduce the subjectivity of the obtained results by replacing manual measurements with automatic measurements,
- to be able to store information relating to a test so as to notably be able to compare them with information obtained during tests conducted later on.

SUMMARY OF THE INVENTION

For this purpose, it proposes a test system involving as a universal single sensor, a digital photographic apparatus of a conventional type which may be remote-controlled from a computer system including a processor and a man/machine interface such as a keyboard/screen set, this photographic apparatus including an objective optionally with a variable focal length, the focusing of which may be carried automatically by means of a telemetry device (for example of the "autofocus" type, said processor being itself coupled, via remote transmission means, to a presentation device to be tested, means being provided for positioning the photographic apparatus facing the presentation device, the testing of which is desired, preferably coaxially to the latter.

The processor is then programmed in order to carry out a sequence comprising the following operating phases:

- a self-positioning phase including control by the processor of the display or projection by the presentation device of positioning marks, the analysis of the image obtained by the photographic apparatus and the control by the processor of the positioning means depending on the results of said analysis,
- an optional calibration phase in order to cause, for example by adjusting the focal length of the objective, the image generated by the presentation device to occupy a predetermined area of the digital photograph taken by the still camera (for example the whole photograph),
- a phase for automatically focusing the objective so as to obtain a sharp image,
- a test phase during which the processor executes at least one sequence of tests including the application by the processor to the display system of stimuli which may consist in information to be displayed and/or in controls aiming at modifying the operating parameters of the display and then, following the application of stimuli, the taking of a digital photograph with the photographic apparatus and analysis of the thereby taken photograph so as to determine at least one operating parameter of the presentation device, this test sequence being repeated, with suitable stimuli for each of the parameters of the presentation device, which is intended to be checked.

Of course, the processor will be programmed so as to be able to execute test sequences suitable for all the types of presentation devices for which testing is intended. In this case, the system may comprise means for identifying the type of apparatus to be tested, and means allowing determination, following this identification, of the corresponding test sequence to be executed.

BRIEF DESCRIPTION OF THE DRAWINGS

An embodiment of the invention will be described hereafter, as a non-limiting example, with reference to the appended drawing wherein:

The single FIGURE is a schematic illustration of a test system mounted on a bench.

DESCRIPTION OF THE PREFERRED EMBODIMENTS

In the example illustrated in this FIGURE, the test system consists of a bench 1 bearing two supporting structures 2, 3, i.e.:
- a structure 2 for supporting a photographic apparatus 4 with the possibility of adjustment in position, along the longitudinal axis X, X' of the bench and along an axis Y, Y' perpendicular to the plane of this bench,
- a structure 3 for supporting a presentation device 5 (schematically illustrated by a parallelepipedal block) with possibility of adjustment in orientation around a vertical axis V, V' (perpendicular to the plane of the bench 1) and a horizontal axis H, H' (parallel to said bench 1).

In this example, the supporting structure 2 comprises a base 6 with a section in the shape of a slanted C, the core of which is attached on the bench 1 and which supports a mobile carriage 7 along longitudinal slides 8, 9 formed by horizontal cylindrical rods attached through their ends on the parallel wings of the base 6. Actuation of the carriage 7 along the slides 8, 9 is provided by means of a screw actuator driven into rotation by an electric motor housed in the carriage 7. The carriage 7 supports a bracket 10 bearing vertical slides 11, 12 along which the photographic apparatus 4 may slide, by means of a connecting part (not shown) provided at the rear of the photographic apparatus. The displacements of the photographic apparatus 4 along the slides 11, 12 are ensured by a screw actuator driven by a motor 13 firmly attached to the bracket 10.

The supporting structure 3 consists of a supporting part 14 with a U-shaped section, the core of which is rotatably mounted on the bench 1 around the vertical axis V, V' via a base 15 housing a motor for driving the part 14 into rotation.

The presentation device 5 is mounted in a supporting and attachment frame 16 rotatably mounted between the wings of the supporting part 14, around the horizontal axis, by means of two coaxial journals 17, 18 passing in corresponding orifices of both wings. The driving into rotation of the presentation device 5 is then provided by means of a gear motor 19 engaged with the journal 18.

The digital camera 4 is a digital apparatus including the usual functions of a camera of the professional type. It has an objective with variable focal length (optical zoom/electronic zoom) and for which the focusing may be carried out automatically by means of a telemetry system (autofocus).

This digital photographic apparatus 4 is for example connected via an USB connection to a processor 20 provided with software designed so as to provide the controls of the photographic apparatus 4, either manually or via a man/machine interface 21 (here a keyboard/screen console), or automatically, according to a predetermined operating sequence.

Also, the presentation device 5 is connected to the processor, which is further programmed in order to execute a test sequence comprising the application to the presentation device of stimuli which may consist in information to be displayed and/or controls aiming at modifying operating parameters of this device.

The processor 20 is further programmed so as to provide the control of the motors of the actuators of both supporting structures via suitable connections and this in order to allow an operator to carry out all the adjustments from the keyboard/screen console. The adjustment of the position of the viewing device (coaxiality of the optical axis of the device and of that of the objective of the photographic apparatus or perpendicularity of the plane of the display relatively to the optical axis of the photographic apparatus) may be carried out automatically in a self-positioning mode, for example by displaying (or projecting) positioning marks (grid or test chart) on the presentation device and analyzing the image provided by the apparatus, and then suitably controlling the actuators by means of the processor 20.

Once the presentation device 5 has been correctly positioned facing the photographic apparatus 4, the processor 20 controls the focusing of the apparatus 4.

In a first phase, it adjusts the focal length of the apparatus 4 so that the image produced by the display 5 occupies a predetermined area of the photograph produced by the apparatus 4 (preferably the whole photograph). It then proceeds with focusing (by means of its telemetry device) so as to obtain a photograph as sharp as possible.

The processor 20 carries out one or more test sequences each including the application to the presentation device of stimuli which may for example lead to the display by the device of information such as grids or test charts and/or controls aiming at modifying the operating parameters of this device (such as luminance, chrominance, contrast, smoothing, line thickness . . . ). The processor 20 then orders one or more photographic shots and then the transfer of digital data relating to the photographs which have just been taken, into its own memories. It then carries out an image analysis of these photographs in order to carry out the characterization of the presentation device.

This characterization may optionally be associated with a self-adjustment and self-calibration process of the presentation device 5.

Of course, the invention may be used both within the scope of quality control at the end of a production line in order to detect and possibly eliminate faulty devices, and within the scope of maintenance.

In the latter case, the system according to the invention may be installed on site, for example in the cockpit of an aircraft in order to test the display and viewing devices of this site. In this case, taking into account the fixity of the display devices, only positioning or self-positioning means of the photographic apparatus mounted on the structure of the cockpit should be provided.

By means of the arrangements described earlier, with the system according to the invention, it is possible to obtain many advantages such as notably:

- optimization of test times,
- partial, or even total automation of the tests,
- better objectivity of the results (the analysis being carried out purely digitally, one gets rid of any subjective appreciation),
- possibility of storing the results in memory, notably with view to statistical analyses,
- larger exhaustiveness of the tests,
- very large flexibility in use and multiple possibilities of adaptation, notably to new types of information presentation devices.

The invention claimed is:

1. A test system comprising:
    only a single digital photographic apparatus comprising an objective with variable focal length, and a telemetry device for automatically focusing the objective, the digital photographic apparatus being able to be remote-controlled,
    a positioning apparatus on which the digital photographic apparatus is mounted the positioning apparatus allowing the digital photographic apparatus to be centred facing an optoelectronic information presentation device to be tested,
    a computer system for remotely controlling the digital photographic apparatus, the computer system comprising a processor and a man/machine interface,
    a transmission apparatus coupling the processor the presentation device; and
    wherein the processor is programmed so as to carry out, at least one time, a sequence of phases comprising the following operating phases:
    a self-positioning phase comprising control by the processor of the display or projection by the presentation device of positioning marks, analysis of the image obtained by the digital photographic apparatus and control by the processor of the positioning apparatus to position the digital photographic apparatus correctly depending on the results of said analysis,
    a calibration phase comprising adjustment of the focal length of the objective so that the image produced by the presentation device occupies a predetermined area of the photographs produced by the photographic apparatus,
    a phase for automatically focusing the objective,
    a test phase during which the processor executes at least one test sequence for testing the presentation display using photographs taken by the photographic apparatus, comprising at least one test among: a colorimetric test, a color uniformity test, a luminance measurement test, a test for detecting faulty pixels or a test of overlay of elementary patterns in the image, said tests each comprising:
    application, by the processor to the presentation device, of stimuli which may consist of at least one of information to be displayed or controls aiming at modifying the operating parameters of said presentation device, and then,
    following the application of said stimuli, taking a digital photograph of the presentation device by the digital photographic apparatus, and then
    analysis of the taken photograph by the processor so as to determine and check at least one operating parameter of the presentation device, wherein the test sequence is repeated for each of the parameters of the presentation device, which is intended to be checked, and
    characterization of the presentation device from the analysis of the parameters of the thereby obtained photographs, in order to control a plurality of parameters relating to the operation of the presentation device.

2. The system according to claim 1, wherein in the case when the device to be tested is an information presentation device, in which the information is displayed on a screen, the automatic focusing phase is carried out by means of a telemetry device with which the photographic apparatus is equipped.

3. The system according to claim 1, comprising means for identifying the type of device to be tested and means for determining, following this identification, the corresponding test sequence to be executed.

4. The system according to claim 1, wherein the photographic apparatus is mounted on a supporting structure mobile along two perpendicular axes, the displacements of said apparatus along said axes being controlled by two respective actuators driven by the processor.

5. The system according to claim 1, wherein the information presentation device to be tested is mounted on a supporting structure orientatable around two perpendicular axes of rotation, the orientation of the presentation device being provided by two respective actuators controlled by the processor.

* * * * *